United States Patent [19]

Burgdorf

[11] 4,239,294
[45] Dec. 16, 1980

[54] MOTORCYCLE HYDRAULIC BRAKE SYSTEM WITH BRAKE FORCE REGULATOR

[75] Inventor: Jochen Burgdorf, Offenbach-Rumpenheim, Fed. Rep. of Germany

[73] Assignee: ITT Industries, Inc., New York, N.Y.

[21] Appl. No.: 60,935

[22] Filed: Jul. 26, 1979

[30] Foreign Application Priority Data

Aug. 31, 1978 [DE] Fed. Rep. of Germany ....... 2837963

[51] Int. Cl.³ .............................................. B60T 8/26
[52] U.S. Cl. ................................ 303/6 C; 188/106 P; 188/344; 188/349
[58] Field of Search ............ 303/6 C; 188/349, 106 P, 188/106 F, 106 R, 344, 345

[56] References Cited

U.S. PATENT DOCUMENTS

| 3,459,000 | 8/1969 | Oberthür | 303/6 C |
| 4,004,839 | 1/1977 | Burgdorf | 303/6 C |

FOREIGN PATENT DOCUMENTS 2558825  7/1977  Fed. Rep. of Germany ......... 303/6 C

*Primary Examiner*—Douglas C. Butler
*Attorney, Agent, or Firm*—John T. O'Halloran; Alfred C. Hill

[57] ABSTRACT

In a known motorcycle brake system with a brake force regulator, the pedal master cylinder acts on the front-wheel brake and on the rear-wheel brake, and the hand master cylinder acts only on the front-wheel brake. The brake force regulator's control behavior is influenced by the hand master cylinder. This known system has functional disadvantages because the rear-wheel brake becomes evacuated if only the hand master cylinder is actuated. The motorcycle brake system with brake force of the present invention eliminates this disadvantage by arranging for a brake caliper of the front-wheel brake to be actuated by the regulated pressure of the pedal master cylinder and the rear-wheel brake to be actuated by the non-regulated pressure of the pedal master cylinder.

5 Claims, 2 Drawing Figures

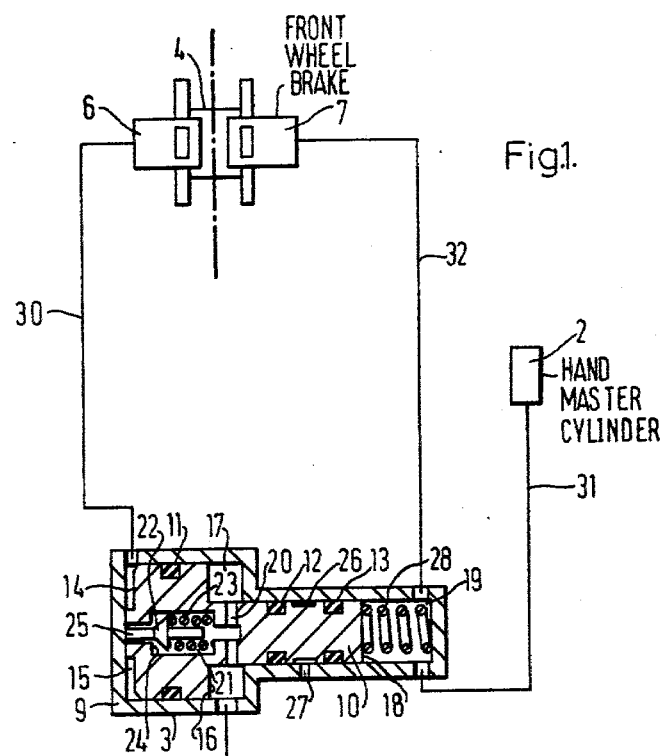
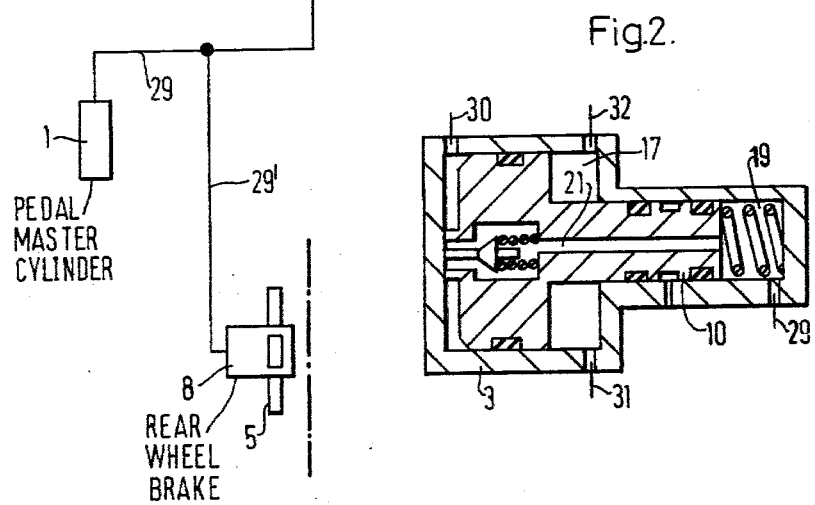

MOTORCYCLE HYDRAULIC BRAKE SYSTEM WITH BRAKE FORCE REGULATOR

BACKGROUND OF THE INVENTION

The present invention relates to a motorcycle hydraulic brake system with a brake force regulator, in which in a first brake circuit a pedal master cylinder acts on a first brake caliper of a dual-circuit front-wheel brake as well as on a rear-wheel brake, in which in a second brake circuit a hand master cylinder is provided which acts on a second brake caliper of the front wheel brake, and in which the brake force regulator comprises a pressure reducing valve inserted in the first brake circuit and controllable by the pressure of the second brake circuit.

A motorcycle brake system of this type is described in German Pat. No. DE-OS 2,558,825. The brake force regulator used in this system resembles conventional brake force regulators for passenger cars. By actuating the pedal master cylinder, pressure is initially supplied to a front-wheel brake unreduced and to the rear-wheel brake reduced. If in addition the hand master cylinder is actuated, the pressure thereby generated counteracts the control force of the brake force regulator so that the latter reduces the pressure of the rear-wheel brake to a greater extent than if only the pedal master cylinder were actuated. In this arrangement the brake force regulator is so designed that the displacement travel of its stepped piston is sufficient to reduce the pressure in the rear-wheel brake by means of an increase in the pressure of a front-wheel brake.

The prior known motorcycle brake system has the functional disadvantage that its stepped piston may be displaced also when pressure is built up solely by the hand master cylinder, i.e., when only the hand brake, which acts on the front wheel, is applied. The displacement of the stepped piston causes pressurized fluid to be drawn from the rear-wheel brake. As a result, a vacuum will occur in the rear-wheel brake which may draw in air and impurities that can result in a failure of the brake.

It is a further disadvantage of the known arrangement that on actuation of the hand master cylinder the stepped pistion is required to be displaced against the pressure of the pedal master cylinder. This means that full reduction of the pressure of the rear-wheel brake can be achieved only if the operator's pedal force is reduced simultaneously with the actuation of the hand master cylinder, thereby increasing the volume of the pedal master cylinder. In particular in a panic situation, the operator cannot be expected to react so as to apply a metered measure of brake force.

SUMMARY OF THE INVENTION

It is, therefore, an object of the present invention to provide a motorcycle brake system of the type referred to hereinabove in which the additional actuation of the hand master cylinder in the presence of pressure in the first brake circuit causes a reduction of the pressure of the rear-wheel brake, without the need to increase the volume of the pedal master cylinder, and in which the rear-wheel brake remains unaffected when only the hand master cylinder is actuated.

A feature of the present invention is the provision of a motorcycle hydraulic brake system having a brake force regulator comprising: a first brake circuit having a pedal master cylinder acting on a rear wheel brake and a first brake caliper of a dual-circuit front-wheel brake; a second brake circuit having a hand master cylinder acting on a second brake caliper of the front-wheel brake; and the regulator includes a pressure reducing valve disposed in the first brake circuit between the pedal master cylinder and the first brake caliper and controlled by pressure of the second brake circuit, the reducing valve providing regulated pressure to the first brake caliper and the rear wheel brake is provided with non-regulated pressure from the pedal master cylinder.

The motorcycle brake system constructed according to the principles of the present invention involves an approach completely different from the known arrangement. In the subject matter of the present invention, actuation of the pedal master cylinder results in the supply of a non-regulated pressure to the rear-wheel brake, while the front-wheel brake receives a regulated pressure which is reduced compared to the pressure the rear-wheel brake is subjected to. Only on additional actuation of the hand master cylinder is the pressure of the rear-wheel brake reduced while at the same time the brake force at the front wheel is increased. Practice has shown that in contrast to motor cars, locking of the front wheel of a motorcycle is a greater disadvantage than a rear-wheel lock. When the front wheel stops rotating, the steering ability becomes lost which the motorcyclist requires to keep his balance. A fall is inevitable if the steering ability is lost. The subject matter disclosed in the present invention prevents the occurrence of a locked condition of the front wheel, because on actuation of the pedal master cylinder alone, the rear wheel is braked to a greater extent than the front wheel.

An advantageous improvement of the present invention results in a simple construction and low-cost manufacture of the brake force regulator which is moreover characterized by a safe operation. In this improvement, the brake force regulator comprises a stepped piston whose greater piston end surface is subjected to the regulated pressure and whose annular surface on the greater piston step is subjected to the non-regulated pressure of the first brake circuit, and whose smaller piston end surface is subjected to the pressure of the second brake circuit. In a variant of this arrangement, the regulator characteristic can be altered by choosing different surface area ratios. In such a variant, the brake force regulator comprises a stepped piston whose greater piston end surface is subjected to the regulated pressure and whose smaller piston end surface is subjected to the non-regulated pressure of the first brake circuit, and an annular surface on the greater piston step is subjected to the pressure of the second brake circuit.

In a suitable embodiment of the brake force regulator, the stepped piston is loaded by a control spring in the direction in which the pressure of the second brake circuit acts. This arrangment has the advantage that, when the hand master cylinder alone is actuated, the stepped piston cannot be displaced since it has already assumed its end position because of the force of the control spring. In that case, the first brake circuit remains completely unaffected.

BRIEF DESCRIPTION OF THE DRAWING

Above-mentioned and other features and objects of this invention will become more apparent by reference to the following description taken in conjunction with the accompanying drawing, in which:

FIG. 1 is a schematic illustration, partially in longitudinal cross section, of a motorcycle hydraulic brake system in accordance with the principles of the present invention; and FIG. 2 illustrates a modification of the embodiment of FIG. 1.

DESCRIPTION OF THE PREFERRED EMBODIMENTS

The motorcycle brake system shown in FIG. 1 comprises a pedal master cylinder 1, a hand master cylinder 2, a brake force regulator 3 and a front-wheel brake 4 and a rear-wheel brake 5. Front wheel brake 4 is a dual-circuit brake including a first brake caliper 6 and a second brake caliper 7, and rear-wheel brake 5 includes a brake caliper 8.

Brake force regulator 3 comprises a housing 9 with a stepped bore in which a stepped piston 10 is arranged and sealed relative to housing 9 by means of seals 11, 12 and 13. Stepped piston 10 includes a greater piston end surface 14 providing a boundary for a regulator outlet chamber 15, an annular surface 16 provided on the greater piston step to provide a boundary for a regulator inlet chamber 17, and a smaller piston end surface 18 to provide a pressure chamber 19. A radial bore 20 and a coaxial fluid passageway 21 disposed within stepped piston 10 connect regulator inlet chamber 17 with regulator outlet chamber 15. The fluid passageway 21 accommodates a valve closure member 22 which is urged into engagement with a valve seat 24 by a spring 23. Valve closure member 22 includes a tappet 25 extending out of stepped piston 10 and bearing against a wall of housing 9.

Seals 12 and 13 are disposed on the smaller piston step. Located between seals 12 and 13 is an annular chamber 26 which connects with atmosphere through a radial opening 27. Pressure chamber 19 houses a control spring 28 having one end thereof bearing against a wall of housing 9 and its other end bearing against end surface 18 of the smaller piston step.

Pedal master cylinder 1 is connected with regulator inlet chamber 17 by means of a fluid line 29 and is connected with brake caliper 8 of rear-wheel brake 5 by means of a fluid line 29'. A fluid line 30 leads from regulator outlet chamber 15 to first brake caliper 6 of front-wheel brake 4. A fluid line 31 connects hand master cylinder 2 with pressure chamber 19, and a further fluid line 32 connects pressure chamber 19 with second brake caliper 7 of front-wheel brake 4.

The mode of operation of the motorcycle brake system constructed in accordance with the principles of the present invention is as follows:

With the brakes not applied, stepped piston 10 of brake force regulator 3 is in its end position adjacent outlet chamber 15. In this position, tappet 25 of valve closure member 22 bears against the wall of housing 9, and fluid passageway 21 between regulator inlet chamber 17 and regulator outlet chamber 15 is open.

If pedal master cylinder 1 is actuated first, the pressure therein generated is transmitted through fluid lines 29 and 29' to regulator inlet chamber 17 and to brake caliper 8 of rear-wheel brake 5. From regulator inlet chamber 17, the pressure is transmitted through bore 20 and fluid passageway 21 into regulator outlet chamber 15 and onwards through fluid line 30 to first brake caliper 6 of front-wheel brake 4. Because of the difference in area between surfaces 14 and 16 on stepped piston 10, a force is generated which counteracts the force of control spring 28 and displaces, on attainment of a specific pressure, stepped piston 10 against control spring 28 whereby valve closure member 22 moves into engagement with valve seat 24 and closes fluid passageway 21. From this moment on, the pressure transmitted from pedal master cylinder 1 to first brake caliper 6 of front-wheel brake 4 is of a magnitude which is reduced in accordance with the ratio of surface areas 14 and 16. Thus, the rear wheel is braked to a greater degree than the front wheel, the rear wheel is, so to speak, overbraked.

If hand master cylinder 2 is actuated additionally, the pressure therein generated is transmitted through fluid line 31 to pressure chamber 19 of brake force regulator 3 and, thence, unchanged, through fluid line 32 to second brake caliper 7 of front-wheel brake 4. Stepped piston 10 is thus subjected to a further force which is caused by the pressure in pressure chamber 19 and displaces stepped piston 10 in that direction in which the control force acts. This displacement of stepped piston 10 is possible without requiring the volume of pedal master cylinder 1 to be increased. The displacement of stepped piston 10 in the direction of regulator outlet chamber 15 causes disengagement of valve closure member 22 from its valve seat 24. The pressures prevailing on the two sides of the valve being different the moment the valve opens, the pressures will be balanced when the valve is open, which results in flow of fluid to first brake caliper 6 and a pressure increase there. The fluid volume stems from brake caliper 8 of rear-wheel brake 5 and pedal master cylinder 1, that is, the pressure in regulator inlet chamber 17, in brake caliper 8 and in pedal master cylinder 1 drops. The resultant pressure reduction then commencing at rear-wheel brake 5 is desired because of the dynamic axle-load shift occurring during the braking action.

If only hand master cylinder 2 is actuated, the front wheel is braked by the pressure acting in second brake caliper 7. Stepped piston 10 of brake force regulator 3 remains in its end position adjacent regulator outlet chamber 15. Drawing of brake fluid from any one of the two brake calipers 6 or 8 is thus not possible.

FIG. 2 is a modification of the embodiment of FIG. 1. The differences between the two embodiments are as follows:

Fluid passageway 21 extends up to chamber 19 which forms the regulator inlet chamber and is connected to fluid line 29. The radial bore 20 is thereby omitted. Chamber 17 forms the pressure chamber for the second brake circuit, with fluid lines 31 and 32 being connected to chamber 17.

While I have described above the principles of my invention in connection with specific apparatus it is to be clearly understood that this description is made only by way of example and not as a limitation to the scope of my invention as set forth in the objects thereof and in the accompanying claims.

I claim:

1. A motorcycle hydraulic brake system having a brake force regulator comprising:
   a first brake circuit having a pedal master cylinder connected directly to a rear wheel brake and acting through said regulator on a first brake caliper of dual-circuit front-wheel brake;
   a second brake circuit having a hand master cylinder acting through said regulator on a second brake caliper of said front-wheel brake; and
   said regulator includes
      a pressure reducing valve disposed in said first brake circuit between said pedal master cylinder and said first brake caliper and controlled by pressure of said second brake circuit, said reducing valve providing regulated pressure to said first brake caliper, and said rear wheel brake is provided with non-regulated pressure directly from said pedal master cylinder.

2. A motorcycle brake system according to claim 1, wherein said regulator further includes a stepped piston having a piston end surface on its larger diameter step adjacent said first brake caliper subjected to said regulated pressure, an annular surface on its larger diameter step spaced from said larger step end surface subjected to said non-regulated pressure and an end surface on its smaller diameter step subjected to pressure of said second brake circuit.

3. A motorcycle brake system according to claim 2, wherein said stepped piston is loaded by a control spring in the direction in which said pressure of said second brake circuit acts.

4. A motorcycle brake system according to claim 1, wherein said regulator further includes a stepped piston having a piston end surface on its larger diameter step adjacent said first brake caliper subjected to said regulated pressure, an annular surface on its larger diameter step spaced from said larger step end surface subjected to pressure of said second brake circuit and an end surface on its smaller diameter step subjected to said non-regulated pressure.

5. A motorcycle brake system according to claim 4, wherein said stepped piston is loaded by a control spring in the direction in which said pressure of said second brake circuit acts.

* * * * *